(12) United States Patent
Hassan et al.

(10) Patent No.: US 12,193,004 B2
(45) Date of Patent: Jan. 7, 2025

(54) APPARATUS, METHOD FOR A RADIO COMMUNICATIONS NETWORK AND USE THEREOF

(71) Applicant: Robert Bosch GmbH, Stuttgart (DE)

(72) Inventors: Khaled Shawky Hassan, Laatzen (DE); Klaus Sambale, Oberhausen (DE); Nadia Brahmi, Hildesheim (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 18/310,372

(22) Filed: May 1, 2023

(65) Prior Publication Data

US 2023/0337237 A1    Oct. 19, 2023

Related U.S. Application Data

(62) Division of application No. 17/319,274, filed on May 13, 2021, now Pat. No. 11,647,502.

(30) Foreign Application Priority Data

May 14, 2020    (EP) .................................... 20174729

(51) Int. Cl.
*H04W 72/20*    (2023.01)
*H04W 28/16*    (2009.01)

(52) U.S. Cl.
CPC ........... *H04W 72/20* (2023.01); *H04W 28/16* (2013.01)

(58) Field of Classification Search
CPC ....... H04W 72/20; H04W 28/16; H04W 4/00; H04W 72/12; H04W 72/04; H04W 72/0406; H04W 72/1278; H04W 4/40; H04W 4/029; H04W 48/16; H04W 16/10; H04W 24/02; H04W 12/02; H04W 76/14; H04L 12/66; H04L 29/06; H04L 12/28;
(Continued)

(56) References Cited

U.S. PATENT DOCUMENTS 10,285,194 B2 * 5/2019 Zhao ................... H04W 74/002
11,310,776 B2 * 4/2022 Maaref ................. H04W 72/20
(Continued)

FOREIGN PATENT DOCUMENTS

EP    3550905 A1    10/2019

OTHER PUBLICATIONS

Robert Bosch GMBH, "Sidelink Resource Allocation Enhancements", 3GPP Draft, 3rd Generation Partnership Project E-Meeting, Aug. 2020, 5 pages.

*Primary Examiner* — Man U Phan
(74) *Attorney, Agent, or Firm* — Michael Best & Friedrich LLP

(57) ABSTRACT

An apparatus comprising at least one processor, at least one memory including computer program code, and at least one communication module. The apparatus receives a plurality of radio signals. The apparatus determines at least one communication parameter based on at least one of the radio signals. The apparatus determines at least one resource conflict indicator (RCI) based on the received radio signals and a transmission parameter. The at least RCI indicates at least one radio resource that has a potential risk of a resource conflict. The determined at least one communication parameter is mapped to the transmission parameter for the RCI. The apparatus transmits the RCI.

16 Claims, 5 Drawing Sheets

(58) Field of Classification Search
CPC ... H04L 45/00; H04L 1/00; H04L 1/18; H04L 5/00; H04L 1/1819; H04L 1/1854; H04L 5/0053; H04J 3/16; G06F 17/10; G06F 9/44
USPC .......................................................... 370/329
See application file for complete search history.

(56) References Cited

U.S. PATENT DOCUMENTS

| | | | |
|---|---|---|---|
| 11,405,896 B2* | 8/2022 | Zhao | H04L 5/0094 |
| 11,445,547 B2* | 9/2022 | Hassan | H04W 74/02 |
| 2013/0279392 A1 | 10/2013 | Rubin et al. | |
| 2020/0170027 A1* | 5/2020 | Yang | H04B 7/088 |
| 2021/0051525 A1* | 2/2021 | Cao | H04W 28/26 |
| 2021/0219269 A1* | 7/2021 | Lee | H04W 40/22 |
| 2021/0219320 A1* | 7/2021 | Belleschi | H04W 72/20 |
| 2021/0219340 A1* | 7/2021 | Shi | H04W 76/19 |
| 2021/0321380 A1* | 10/2021 | Zhao | H04L 1/1861 |
| 2021/0337573 A1* | 10/2021 | Zhao | H04L 1/0038 |
| 2022/0061006 A1* | 2/2022 | Liu | H04W 56/001 |
| 2022/0070847 A1* | 3/2022 | Yoshioka | H04L 1/1861 |
| 2022/0095280 A1* | 3/2022 | Farag | H04W 72/23 |
| 2022/0167374 A1* | 5/2022 | Li | H04W 72/1263 |
| 2022/0201678 A1* | 6/2022 | Chang | H04W 72/1215 |
| 2022/0248376 A1* | 8/2022 | Hui | H04W 72/044 |
| 2022/0256507 A1* | 8/2022 | Yoshioka | H04W 92/18 |
| 2022/0295469 A1* | 9/2022 | Zhao | H04L 5/0053 |
| 2022/0303954 A1* | 9/2022 | Hwang | H04W 72/0453 |
| 2022/0303956 A1* | 9/2022 | Hong | H04L 1/18 |

* cited by examiner

APPARATUS, METHOD FOR A RADIO COMMUNICATIONS NETWORK AND USE THEREOF

RELATED APPLICATIONS

This application is a divisional of and claims priority to U.S. patent application Ser. No. 17/319,274, entitled "Apparatus, Method For A Radio Communications Network And Use Thereof" filed May 13, 2021, which granted as U.S. Pat. No. 11,647,502 on May 9, 2023, the entire content of which is hereby incorporated by reference herein.

BACKGROUND OF THE INVENTION

The description provides advantageous examples for operating an apparatus of a radio communications network.

Connected mobility is gaining focus in different communication standards, e.g., the IEEE 802.11p/bd and 3GPP LTE/NR V2X. The latter is being developed further together with a cellular coverage. In case of 3GPP LTE/NR V2X, two situations are considered, the in coverage and the out of coverage. Additionally, part of the UEs who are connected together may be in-coverage, while other may be out of the network coverage. This case is called partial out of coverage as in FIG. 1. When the vehicle use-equipment (UE) is in coverage, the network and its terminal (e.g., base-station (BS), evolved-Node Base-station (eNB), or 5G-NR-Node Base-station (gNB)), the UE can be configured to perform sidelink (direct) communication inter-UEs. Resources allocation, data control, and communication procedure in this case is controlled by the UE. However, if the UE is the out-of-coverage of EUTRA or 5G-NR cells, the UE is pre-configured with the mandatory configuration for autonomous communication over the sidelink frequencies. In this case, the UE is also pre-configured with the out-of-coverage frequencies, which includes the intelligent transport system (ITS) frequencies.

SUMMARY OF THE INVENTION

A first aspect of the description is directed to an apparatus comprising at least one processor, at least one memory including computer program code, and at least one communication module, the at least one memory and computer program code configured, with the at least one processor, and the at least one communication module, to cause the apparatus at least to: receive a plurality of radio signals; determine at least one resource conflict indicator in dependence on the received radio signals, wherein the at least one resource conflict indicator indicates at least one radio resource that has a potential risk of a resource conflict; and transmit the resource conflict indicator.

The resource conflict indicator provides information about potentially conflicting resources in the network. For example, receiving entities, which transmit data via distributed scheduling mechanisms benefit. In addition, entities, which are not able to do sensing or only do partial sensing, will benefit. Sensing operations of other entities can even be reduced, resulting in a network-wide energy consumption.

According to an advantageous example, the apparatus is further configured to: determine the at least one resource conflict indicator at a point in time; and transmit and/or re-transmit the resource conflict indicator if a validity period is running since the determined point in time; and/or transmit a validity indicator associated with the determined at least one resource conflict indicator.

Advantageously, the validity of the resource conflict indicator is pre-determined and the transmission event is randomized in order to increase equality between entities transmitting resource conflict indicators on the same channel.

According to an advantageous example, the apparatus is further configured to: determine at least one communication parameter in dependence on at least one of the monitored radio signals; and determine the at least one validity period in dependence on the determined at least one communication parameter.

Advantageously, the validity period adapts to the channel state. Distributed Scheduling benefits due to a managed penetration of the network by conflict indicators, which assist other UEs to reserve and use potentially non-conflicting radio resources.

According to an advantageous example, the apparatus is further configured to: determine at least one communication parameter in dependence on at least one of the monitored radio signals; map the determined at least one communication parameter to at least one transmission parameter for the resource conflict indicator; and determine and/or transmit the resource conflict indicator in dependence on the transmission parameter.

Advantageously, the transmission of the resource conflict indicator depends on the determined communication parameters indicating the probably conflicting communication.

According to an advantageous example, the transmission parameter is a priority, and wherein the apparatus is further configured to: determine a plurality of resource conflict indicators associated with a respective priority as the at least one transmission parameter; and select one of the plurality of resource conflict indicators in dependence on the associated priorities; and transmit the selected one of resource conflict indicators.

Advantageously, the resource conflict indicators are put into a priority queue. Therefore, a priority scheduling of the resource conflict indicators is provided.

According to an advantageous example, the apparatus is further configured to: receive at least a part of the mapping between the at least one communication parameter and the at least one transmission property.

Advantageously, the network is able to configure the apparatus with the mapping in order to adapt the penetration of the network with the resource conflict indicators.

According to an advantageous example, the apparatus is configured to: draw a randomized value; and determine and/or transmit the resource conflict indicator when the determined randomized value exceeds a probability threshold.

The randomized penetration of the radio communications network has several advantages. For example, other communication can override the resource conflict indicator and a distributed penetration of the network can be established.

According to an advantageous example, the apparatus is configured to: determine at least one communication parameter in dependence on at least one of the monitored radio signals; and determine the probability threshold in dependence on the determined at least one communication parameter.

Advantageously, the probability of the transmission of the resource conflict indicator is adapted to the present radio situation.

According to a second aspect of the description a method to operate an apparatus is provided, the method comprising: receiving a plurality of radio signals; determining at least one resource conflict indicator in dependence on the received radio signals, wherein the at least one resource conflict indicator indicates at least one radio resource that has a potential risk of a resource conflict; and transmitting the resource conflict indicator.

According to a third aspect of the description an apparatus is provided, the apparatus comprising at least one processor, at least one memory including computer program code, and at least one communication module, the at least one memory and computer program code configured, with the at least one processor, and the at least one communication module, to cause the apparatus at least to: receive at least one resource conflict indicator, wherein the at least one resource conflict indicator indicates at least one radio resource that has a potential risk of a resource conflict; determine data for a transmission; determine a radio resource for the transmission of the data in dependence on the received at least one resource conflict indicator; and transmit the determined data via the determined radio resource.

Advantageously, the apparatus is able to suppress the use of potentially conflicting radio resources. In particular distributed scheduling benefits as the apparatus is of knowledge of potential conflicts detected by a remote apparatus.

According to an advantageous example, the apparatus is further configured to: receive a validity indicator associated with the at least one conflict indicator; and refrain from using at least one radio resource, which is indicated by the at least one resource conflict indicator as long as the received validity indicator indicates that the received at least one resource conflict indicator is valid.

Advantageously, the apparatus is able to forget past conflict situations. On the other hand, if conflict situations persist, the apparatus is able to maintain the blocking of the indicated radio resource.

According to an advantageous example, the apparatus is configured to: determine a set of candidate radio resources in dependence on the received at least one resource conflict indicator; and determine the radio resource for the transmission of the data from the determined set of candidate radio resources.

Advantageously, the indicated potentially conflicting radio resources are avoided to be used.

According to an advantageous example, the apparatus is configured to: draw a randomized value; determine the set of candidate radio resources in dependence on the received resource conflict indicator when the randomized value exceeds a probability threshold.

Advantageously, the probability threshold determines a probability for an entry of the at least one potentially conflicting resource into the set of candidate resources. If the randomized value does not exceed the probability threshold, the received resource conflict indicator is ignored. In other words, the use of the radio resources indicated by the resource conflict indicator is suppressed with a probability.

According to an advantageous example, the apparatus is configured to: determine that at least an overlap between the at least one radio resource indicated via the resource conflict indicator and at least one radio resource, which has been used by the apparatus for a transmission in the past, has occurred; determine, if the overlap is determined, at least one communication parameter in dependence on the at least one radio resource, which has been used by the apparatus for a transmission in the past; and determine the probability threshold in dependence on the at least one determined communication parameter.

Advantageously, the probability threshold adapts to the communication that occurred on the observed radio channel.

A fourth aspect of the description relates to a method to operate an apparatus, the method comprising: receiving at least one resource conflict indicator, wherein the at least one resource conflict indicator indicates at least one radio resource that has a potential risk of a resource conflict; determining data for a transmission; determining a radio resource for the transmission of the data in dependence on the received at least one resource conflict indicator; and transmitting the determined data via the determined radio resource.

A fifth aspect is related to a radio terminal comprising the apparatus according to one of the preceding aspects.

A sixth aspect of the description is directed to a road vehicle comprising the apparatus according to one of the aspects and/or a radio terminal according to the previous aspect.

A seventh aspect of the description relates to a use of the apparatus according to one of the aspects and/or of a radio terminal according to the fifth aspect and/or of a method according to one of the respective aspects.

DETAILED DESCRIPTION

Figure 1:
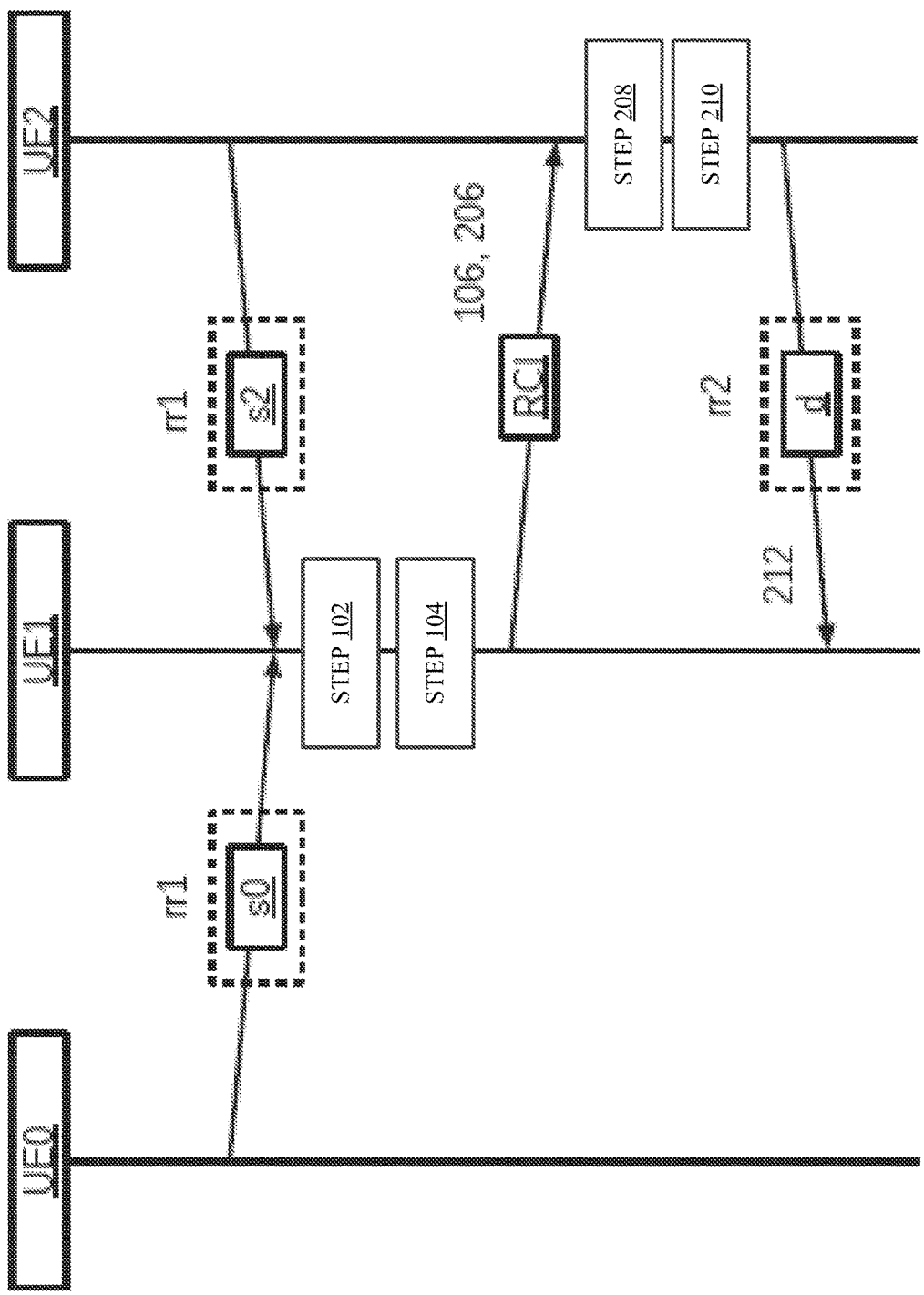
FIGS. 1 to 3 depict schematical sequence diagrams.

FIG. 1 depicts a schematical sequence diagram with three apparatuses UE0, UE1, and UE2. For example, UE0 and UE2 are not able to directly communicate with each other but with UE1. Throughout the description, the term UE is used for User Equipment and apparatus interchangeably and identifies furthermore the entities in the figures.

The first apparatus UE1 comprises receiving means 100 to receive a plurality of radio signals s0, s2 from the apparatus UE0 and UE2. Determining means 104 are configured to determine at least one resource conflict indicator RCI in dependence on the received radio signals s0, s2, wherein the at least one resource conflict indicator RCI indicates at least one radio resource rr1 that has a potential risk of a resource conflict on a radio channel being used by a plurality of apparatuses UE0, UE1, UE2. Once, the potential risk of a resource conflict is identified and RCI is determined, a message for RCI is initialized in a communication layer, e.g., L1-physical layer or L2-MAC layer. Transmitting means 106 are configured to transmit the resource conflict indicator RCI.

The second apparatus UE2 comprises receiving means 206 to receive the at least one resource conflict indicator RCI from the first apparatus UE1. Determining means 208 are configured to determine data d for a transmission. Determining means 210 are configured to determine a radio resource rr2 for the transmission of the data d in dependence on the received at least one resource conflict indicator RC. Transmitting means 212 are configured to transmit the determined data d via the determined radio resource rr2.

The at least one resource conflict indicator RCI is determined by UE1 if a potential conflict is determined. The potential conflict is determined, for example, when least two apparatuses UE0 and UE2 transmit on one or more overlapping radio resources. In another example, a detected transmission by at least two apparatuses UE0 and UE2, for example within the same group, on one or more overlapping time resources i.e., frequency resources may be non-overlapping; also known as half-duplex problem, or partially overlapping will lead to the determination of the resource conflict indicator RCI.

In Sidelink communication, the overlapping transmission, either in time or in both, time and frequency, are computed for apparatuses UE0, UE2 within a certain communication range or belonging to the same communication group. According to another example of sidelink communication, the received signal strength RSSI or RSRP of the identified overlapping transmission results in a determination of a potential conflict, if exceeding a certain threshold. RSSI stands for Received Signal Strength Indicator, RSRP stands for Reference Signal Received Power.

According to an example, the received signal and overlapping identification is determined by the determination means 104 comprising at least one of the following: 1 based on SCI, Sidelink Control Information, decoding, overlapping reservations in an SCI transmitted before the determination instant, RSRP can be computed from the reservation transmission if possible; overlapping transmission identified by two or more decoded SCI containing associated reservations of the same time slot and frequency resources, where the latter can be fully overlapping, partially overlapping, or non-overlapping note: here time resources are always overlapping; 2 based on DMRS decoding: Overlapping transmissions overlapping time/frequency resources are identified by decoding the associated DMRS resources of two or more overlapping transmissions. This is also valid if apparatus UE1 cannot decode the SCI contained in a PSCCH. Hence, an RSSI can be computed; A group may have an identified DMRS, hence, apparatus UE1 decides whether the collision or potential collision belongs to a certain group from the decoded DMRS; Based on RSSI: overlapping transmission overlapping time/frequency resources are identified if the SCI in PSCCH, Physical Sidelink Shared Channel or DMRS, Demodulation Reference Signal, cannot be decoded by apparatus UE1 but the RSSI, of non-decodable transmission/collision, is still above a threshold. If a collision arises between the group members, where the group members uses the same DMRS, hence, DMRS cannot be used to resolve the potential conflict but rather RSSI threshold if RSI is identified, e.g., if SCI is not decodable.

If the apparatus UE1 is able to decode the SCI transmission at least contained in one or more PSCCH transmission, the apparatus UE1 computes the RSRP. If the apparatus UE1 is not able to decode the SCI transmission of one or more overlapping resources, the UE computes the RSSI instead of RSRP. According to an example, for both RSSI and RSSP there may be different threshold declared to identify the potential conflict.

The at least one resource conflict indicator RCI comprises or is accompanied by at least one of the following: a priority field of the assisting information, a time/frequency resources of possible colliding packets i.e., full, partial, no-frequency overlapping, a number of colliding transmitters on different resources, a time validity of the RCI, a periodicity of the occurrence of the RCI, a periodicity of the indicated radio resources, a time offset of the potential resource conflict indicated from the point of time of the reporting of RCI, a periodicity P of RCI, frequency positions of overlapping resources, Resource Pools/BWPs index indices of the potential resource conflict, the validity period p1. The validity period can be evaluated such that, the longer the potential conflict exist, the higher validity timer p1 is sent.

The measurements of the signals s1, s2 according to the determining means 104 are conducting via at least one of the following: sensing, RSSI detection, RSRP detection, etc. . . . Therefore, the RSSI comprises information about possible transmission overlapping or transmission collision between UE0 and UE2, or between other apparatuses transmitting and resulting in radio interference in the radio communications network.

For example, the RCI is carried on a higher layer signaling e.g., a MAC control element or on lower layer control signaling, i.e., 1st stage SCI and/or 2nd stage SCI.

The transmission of the RCI via transmitting means 106 is done by group communication, for example with connection establishment even using unicast PC5 RRC, radio resource control, signaling. The configuration of the RCI and its capability is transmitted using, e.g., PC5 RRC signaling.

According to another example, the RCI is transmitted in connection-less group communication with or without PC5 RRC signaling. The configuration of the RCI is done by a base-station or is pre-configured.

In an exemplary radio communications system with three UEs, the assisting apparatus UE1 conducts measurements and/or data decoding and evaluation of the situation according to determining means 104. The determining means 104 performs at least one of the following: channel sensing, RSSI measurement, RSRP measurement, and CBR constant bit rate measurement.

For example, the apparatus UE1 decodes control data received from at least one other apparatus UE0. The apparatus UE1 identifies the L1/L2 source identity and/or destination identity, TX transmits power of other UEs, Casting type of other UE, priority of communication.

For example, the assisting apparatus UE1 decodes DMRS signals of the said other apparatuses UE0, UE2, if other UEs have different DM-RS patterns or if the DM-RS patterns have logical meaning regarding reservation, channel utilization, groupcast configuration etc.

For example, the assisting apparatus UE1 evaluates the TX positions and/or communication ranges based either on a zone identity or the RSRP of the other apparatuses UE0, UE2.

In yet another example, the apparatus UE1 identifies transmission radio resources and/or retransmission radio resources reserved by other apparatuses UE0, UE2.

Radio resources include time/frequency resource locations and/or a periodicity and/or time/frequency resources patterns.

According to an example, the RCI comprises a time-index, which indicates where the resource conflict exists, with respect to UE1 time-line or the network time-line, i.e., from a reference point. This reference can refer, e.g., to the instance where UE1 reported information, i.e., instance 0, or the network sub-frame number SFN or a time-stamp computed from the GNSS or any other synchronization reference point. In one example, the reporting time slot is the zero instance t=0 and time offset is in negative time position; i.e., based on detected resource conflict at UE1, which may be detected when the collision happens. In another example, the reporting time slot is, again, the zero instance t=0 and time offset is in positive time position, i.e., if the resource conflict is identified for a future slot when SCI reservations are decodable. L bits can be pre-configured to address a position of one or more potential conflicts. Additionally, one more bit b_i may be needed to consider to indicate either position e.g., b_i=0 or negative e.g., b_i=1. Hence, L+1 bits are needed to encode one or more Time-offset positions of the resource conflict from the reporting instance t=0. Assuming the reporting time slot is 0 and time offsets is indicated in negative time position i.e., b_i=1. Time offset is from −T to −Delta_T represented by code points, where Delta_T is a processing time. E.g., if the time-offset has 7 bits, i.e., up to 128 units can be encoded, Delta_T=−1 unit to −T=−127 units assuming b_i=1. If more than one conflict time-offsets are to be reported in the negative time positions, the first code points, say X bits, encode the first instant −T1 e.g., Delta_T=−1 unit to −T=−127, the next Y bits encode the second instance −T2 e.g., −T1+1 unit to −T=−127, and so on until the number of encoded positions are satisfied, i.e., if more than one or two positions. The referenced time-offset, for the potential resource conflict, in the previous example can be considered similarly for a positive time between Dela_T to T; however, assuming b_i=0. Hence, the first instance T1 is from Delta_T=1 to T=127 encoding N-bits, e.g., if L=7 bits. If we have more position, then T2 is encoded from T1+1 to T, and so on. The lower bound for reported offset position Dela_T is a function of the processing time of the layer associated with the reporting of RCI. Hence, the RCI transmission minimum reporting position for a Processing time T_Proc_L1 is for layer 1, where Delta_T >=T_Proc_L1, Processing time T_Proc_L2 is for layer 2, where Delta_T >=T_Proc_L2.

In another example, the position in time and frequency of a potential resource conflict could be encoded in a single value if the value provides enough code points.

In another example, the position in time may be referenced to a global unique slot SFN, time-stamp number computed from the network, UE1 reference node, or GNSS.

A periodicity P indicates the periodicity where RCI is repeated. In this case, if UE2 detected the resource conflict, UE1 may include the periodicity P in the RC. In this case, if P=0, this means that UE1 does not detect or does not require to indicate periodic existence of the resource conflict. However, periodicity P can be a non-zero value which indicates the periodicity in either: Certain Periodicity steps either configured or pre-configured with few amount of bits, e.g., R bits, E.g., if it is 4 bits, then 16 values need to be configured; or in absolute value, i.e., quantized in R bits.

In a further example, the frequency offset as part of the RCI indicates the overlapping resources. In one example, only if overlapping of frequency resources exists on the encoded time positions, e.g., 1 bit for each indicated time offset. Thus, e.g., 0 means no overlap in this case half-duplex or 1 means overlap exits, either partially or fully.

In another example, if overlap exists partially, fully, or no overlap. E.g., with 2 bits, the frequency offset as part of the RCI is encoded as follows: 00=no overlap half-duplex; 01 which means overlapping between 25% to 50% of the frequency resource partial overlap; 10 which means overlapping between 50% to 75% of the frequency resource partial overlap; 11 which means overlapping between 75% to 100% of the frequency resource almost full frequency overlap. A receiving apparatus like UE2 may use this information of the frequency offset to learn about the traffic and severity of the resource conflict.

In another example, if exact overlapping resources are required to be feedback, F-bits of RCI encode the starting position of overlapping frequency resources where F is a function of Log 2number-of-frequency resources, and S-bits of RCI encode the length of the length of overlapping resources, where S-bits is Log 2number-of-frequency resources.

In another example, time and frequency resources, as well as the number of overlapping frequency resources quantity may be encoded in a single code-point in RCI.

In an example, send the time information and/or frequency information of all over lapping resources, or the time information plus the frequency information of all overlapping resources, or the time information plus the frequency information plus the length of all overlapping resources in the assisting information.

In another example, if the potential resource conflict is periodic, send the periodicity along with the overlapping resources time/frequency as in a previous example.

If the frequency position or frequency overlapping information is absent, e.g., in the pre-configured RCI or the received RCI element, all receiving UEs assume that the frequency overlapping is on the whole BWP or the configured resources pool at the identified time-offset/positions.

In an embodiment, the UE2 may also identify the Resource pool index/BWP index, which includes the potential resource conflict. The UE1 identifies one resource pool index per reported RC. In this case, the UE2 that receives the RCI identifies this indicated resource pool index and all other overlapping resources pools if resource pools/BWPs are configured or pre-configured to be overlapping. BWP is an abbreviation for Bandwidth Part.

If the RCI is initiated/established and formed in a higher layer e.g., Layer 2, e.g., MAC layer, the RCI could be carried on a higher layer signaling e.g., a MAC control element MAC-CE, e.g., like CSI reporting.

According to an example, the RCI if found in Layer 2 as stated here can be carried on a unique MAC control element CE, e.g., namely RCI MAC-CE. This RCI MAC-CE may include information about the affected radio resources with the potential conflict, i.e., either periodic or aperiodic, including information stated in a previous embodiment, e.g., time-offset, frequency resources, periodicity, etc. For configured periodic resources a reference to the periodic resources, e.g., configured resource ID e.g., SPS ID, Semi-Persistent Scheduling Identifier if known to UE1, may be signaled.

In another example, the RCI is transmitted based on an extending MAC CE report, e.g., CSI report MAC-CE. In this case, UE1 may send an extended MAC-CE, e.g., CSI report, including: CQI values or other quantified values indicating the existence of the potential conflict. Those values need to be pre-configured to quantify the potential resource conflict in, e.g., a certain resource pool, on certain frequency resources and/or a certain time instance. For example, those quantified values may be: The amount of interference power as stated above, i.e., quantizing the RSSI or RSRP measured values where the resource conflict exists, where the scale of the new Quantized values for the RSSI or RSRP need to be encoded with a certain number of bits.

According to an example, a layer-3 filter is designed to be able to track the severity of the potential resource conflict over elapsed time. The amount of interferers sensed, i.e., the number of colliding interferers, can be quantified. In this case, UE1 may send a single value indicating the amount of interference sources: E.g., using two bits: 00 for one interference, 01 for two interferences, 10 for two/three interferences, 11 for 3 or more interferences. More bits can be used with a mapping. This layer-3 filter may be used to compress the reported information. Hence, filtering is done over time, frequency, and/or space. In our case, the filter may include: The whole resource pool frequency resources filtered as a single value; A set of contiguous sidelink frequency sub-channels resulting in a set of filter values with the same length; A set of contiguous sidelink frequency Resource Blocks or Resource Block groups resulting in a set of filter output with the same length. Where these values are reported per each time instance, where the time instance reported may be encoded to be tracked at the receiving UEs, i.e., to track the determined potential resource conflict over time. An example of Layer-3 filter is represented by the following equation: Fn=1−a*Fn−1+a*Mn, where Fn=This is used for measurement reporting and represent updated filtered measurement result, Fn−1 represent the old filtered measurement result; Mn represents the latest received measurement result from physical layer. a=14 and Mn is filter co-efficient for corresponding measurement quantity received by the quantity configuration parameter.

According to a layer 1 example, the RCI can be sent over Layer 1 control signaling, e.g., sidelink control information SCI, i.e., either on a 1st stage SCI and/or 2nd stage SCI. Additionally, it is also possible that part of the RCI can be carried in lower layer control information, i.e., 1st stage SCI and or 2nd stage SCI. If only part of the RCI is sent on Layer 1 signaling, other information may be conveyed via upper layer signaling higher than Layer 1. However, a receiving UE e.g., UE1 or UE2 can first decode the Layer1 signaling known it is an RCI message. Thereafter, the UE extracts detail reports from Layer 2 signaling. If the receiver UE is not configured to receive RCI, the UE may discarded the packet. A lower layer 1 signaling RCI comprises the 1st stage and the second stage.1st stage may include Flip one of the reserved bits to 1 making it an assisting report i.e., 0 means a normal data or another Physical sidelink feedback channel. 1st stage may include: If no reservation, then assisting information is to be transmitted for one time. 1st stage may include: If there is reservation then it's the repetition of the assisting information. 1st stage may include: Priority field is mapped to the priority values of the assisting information. 2nd stage may include the destination IDs of the UEs source interference. 2nd stage may include the destination IDs of the UEs which may utilize the suggested resource, e.g., a victim UE, or a UE in a group whether it is in the UE-X group or not. 2nd stage may include information about the allocated MAC control element, e.g., number of repetition, time to live, time offset in DFN, SFN.

If an upper layer e.g., Layer 2 is used additionally, e.g., MAC CE it may include at least one of the following: the CSI extend report as described above, containing interference level and number of interferes; affected configurations or SPS or configured resources, e.g., offset, time/freq resources, period, etc., where interference or the resource conflict exists. This may include a mapping with multiple configured resources/multiple SPS with, e.g., one to one, mapping linking configured resource to Layer 2 ID, i.e., identifying affecting or affected UEs; no linking to Layer 2 IDs, i.e., without identifying affecting or affected UEs.

After sensing and information collection about the potential conflict via determining means 210, the apparatus UE1 indicates the source of the potential conflict via the RCI, for example: a one shot transmission; a semi-persistent scheduling SPS i.e., periodic transmission; or a pseudo random time/frequency resource pattern TFRP if TFRP transmission patterns are pre-configured to other UEs. Hence, apparatus UE1 reports possible existing collision or half-duplex problem or possible quantified interference to some concerned UEs or the apparatus UE2. The concerned UEs are the overlapping/colliding UEs.

For example, the apparatus UE2 resolves the potential conflict by identifying a set of one or more specific UEs involved in the potential conflict, e.g., if UE2 is able to decode the associated SCI and/or MAC headers/frames. Apparatus UE2 identifies the other UEs e.g. by Physical layer ID L1 ID resolution, Layer-2 ID L2 ID resolution. For example, UE2 transmits a unicast transmission to one or more of the involved UEs in the identified potential resource conflict. Moreover, UE2 may decide to send a group cast information regarding the potential resource conflict to the group of identified UEs.

For example, the apparatus UE2 defines a communication range to which UEs within the communication range the RCI should be transmitted, e.g., using group-cast. The communication range for resolution-2 is pre-/configured by an upper layer. Apparatus UE2 may execute this range resolution from the beginning or when the resolution of the last paragraph.

According to yet another example, the apparatus UE2 transmits the RCI in a broadcast message. Hence, all nearby UEs should be able to decode the RCI, which is sent either standalone or piggy-packed in a previous message. UE2 executes this resolution from the beginning or when Resolution 1 or 2 according to the last two paragraphs fails.

In an example, the RCI receiving UEs are signaled with the appropriate RCI messages, either Layer 1 or Layer 2 signaling. Those UEs are within a group with UE1 belonging to a group, where the UE group members belonged to the UE1, where the receiving UEs receive a message via groupcast/unicast communication, and/or belonging to a group, where all UE group members belonged to the UE1, where the receiving UEs receive a message via broadcast if unicast or group cast is not configured or not feasible.

In another example, within a group without UE1 belonging to a group, where the UE1 does not belong to this group, where the receiving UEs receive the RCI message via groupcast/unicast/broadcast communication.

However, if UE1 is configured/pre-configured to determine RCI and UE1 declares the RCI, where UE1 cannot identified one or more of the colliding/overlapping UEs, UE-X may send RCI.

An another example, a range of UEs is in the vicinity of UE1 such that the receiving UEs can relate RCI to its past transmitted resources or to future reserved resources, where the RCI is sent using groupcast with a communication range or broadcast. The colliding UEs may assume that the report include their transmission if the time offset refers to one or more of their previously transmitted frames.

The receiving UE1 may suppress existing or continuing transmission e.g., periodic transmission. Additionally the UE1 may decide to suppress future transmission if expected based on the assisting information to have the potential conflict indicated via RCI. Additionally, receiving UEs may consider one or more of the following: RCI for re-evaluation of selected but not previously reserved resources; RCI for pre-empting selected and already reserved resources; RCI to trigger reselection procedure again from scratch.

In another example, the receiving UE2 receive the RCI from other UE1 concerning the identified collision location of resource conflict in future resources or previously used resources and continuing to future resources may decide to send or not to send further transmission on the identified resources with the resource conflict if periodic or aperiodic, if the UE2 is configured to suppress transmission with a probability P_suppress, where P_suppress is configured per resource pool per CBR/CR per transmission priority per communication range. In this case, if the receiving UE2 receives from the assisting UE1 an RCI, the receiving UE2 will decide to generate a random variable, e.g., transmitProbabilty_A_Info. If the transmitProbabilty_A_Info <P_suppress, the receiving UE2 will suppress future possible transmission producing the resource conflict. However, if the opposite happens, i.e., transmitProbabilty_A_Info >P_suppress the UE2 decides to discard the RC. Additionally, the UE2 may decide to increase the P_suppress by X %, where X is configured per resource pool, per CBR, per transmission priority per communication range. A mapping function can be for a single resource pool and comprises, for example, several entries for: P_suppress, CBR, CR, priority, communication range.

Figure 2:
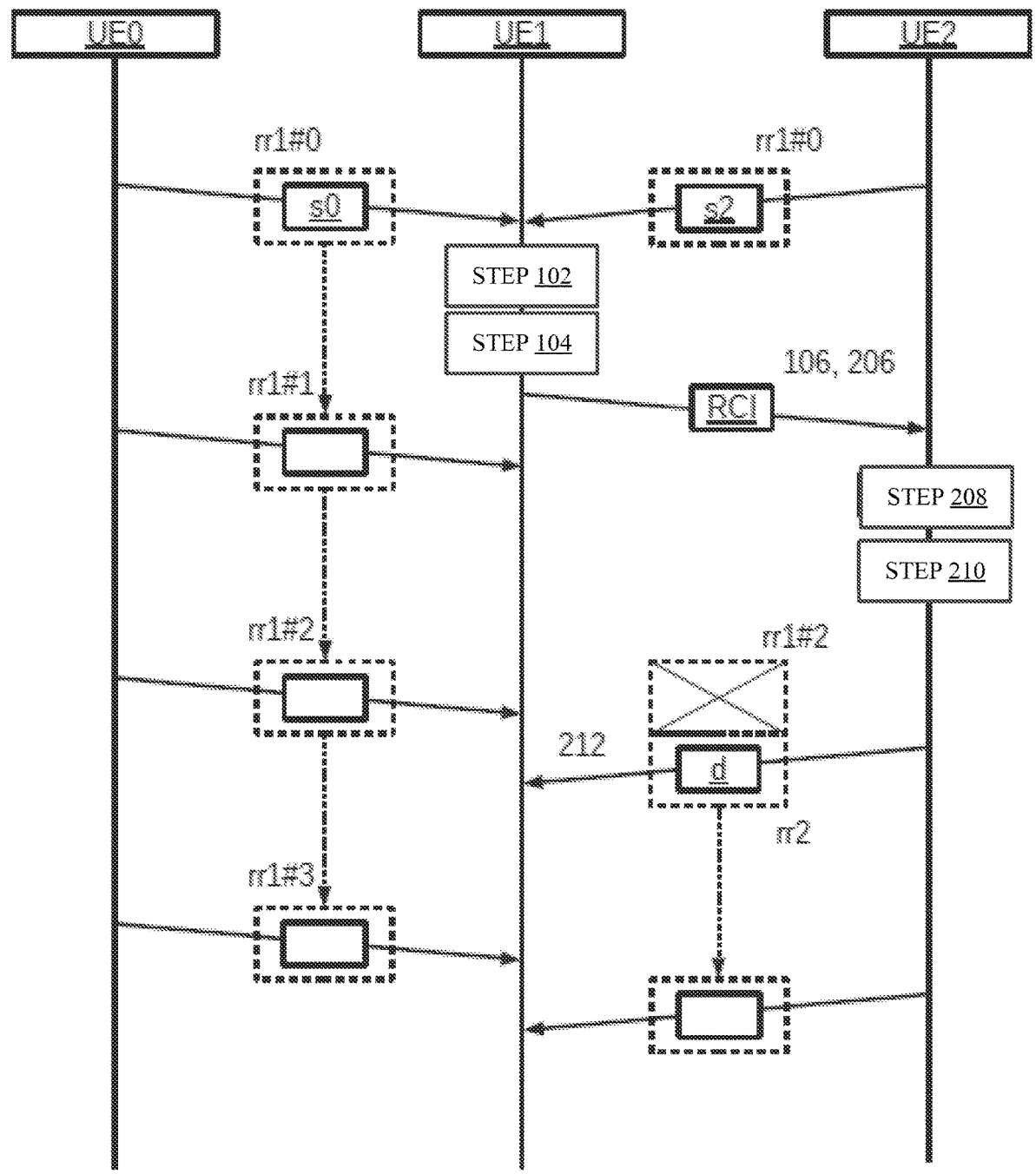

FIG. 2 illustrates a radio situation in a schematic sequence diagram. UE0 transmits signals to UE1, but UE2 is out of reach. UE0 is out of reach for UE2. Signals s0 and s2 on radio resource rr1 #0 collide and indicate a resource conflict situation, which is determined via determining means 104. After receiving the RCI, UE2 determines the radio resource rr1 #2 to omit. To the contrary, UE2 determines rr2 different from rr1 #2 in order to transmit data d. The periodicity of the radio resources rr1 #0 to rr #3 is transmitted via the RCI in order to refrain from using rr1 #2 for the transmission of data d.

Figure 3:
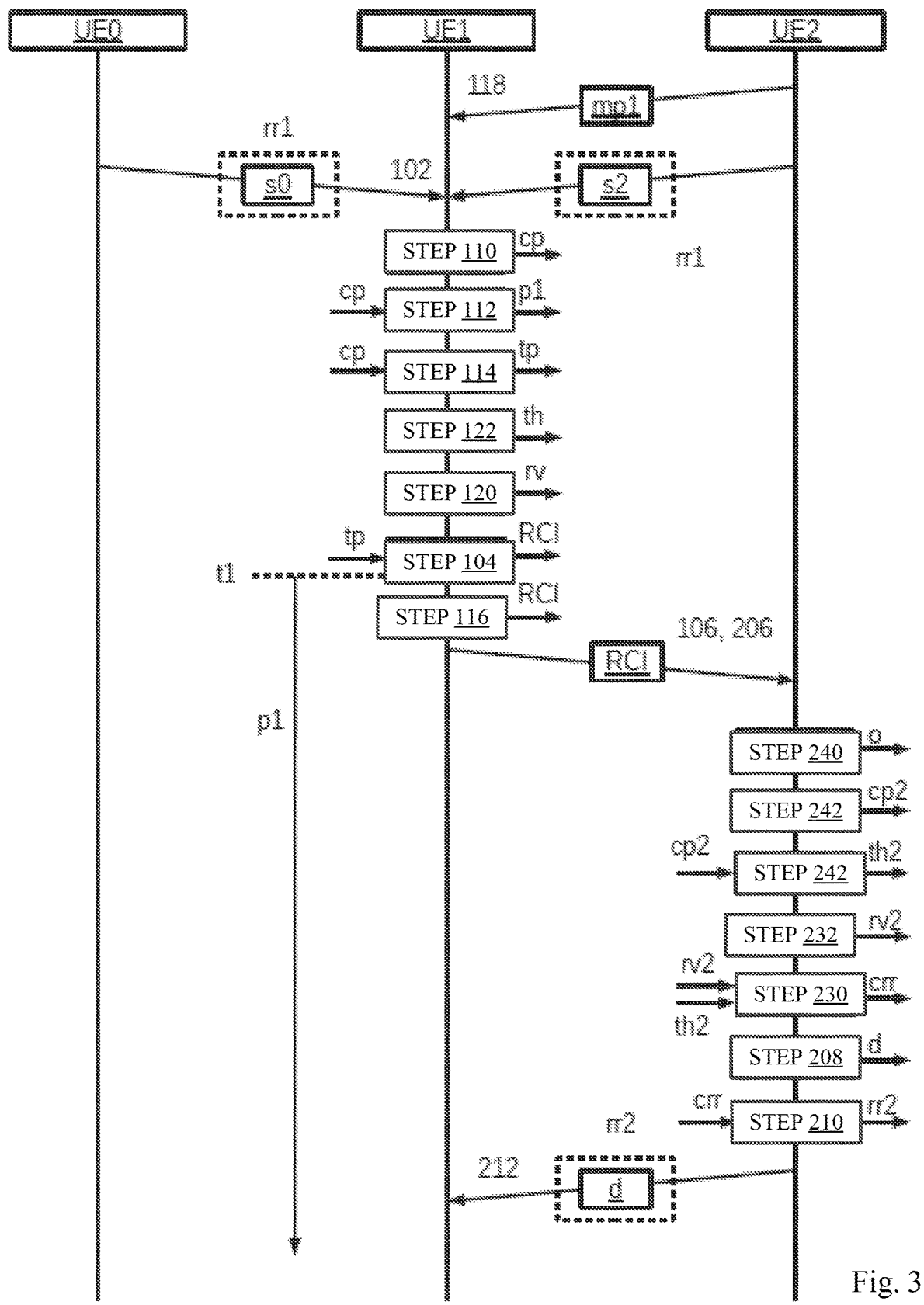

FIG. 3 depicts a schematic sequence diagram. Reference is made to FIG. 1. Receiving means 118 are configured to receive at least a part of a mapping mp1 between the at least one communication parameter cp and the at least one transmission property tp. For example, the mapping mp1 defines a mapping function to different, e.g., QoS and or CBR ranges. The mapping mp1 may be defined or pre-configured per Resource Pool or BWP. The network configures the UE1 by means of the mapping mp1.

Determining means 110 are configure to determine at least one communication parameter cp in dependence on at least one of the monitored radio signals s0, s1. Determining means 112 are configured to determine the at least one validity period p1 in dependence on the determined at least one communication parameter cp.

The at least one validity period p1 determines how many times the potential conflict happens before or how long the potential conflict exists. Therefore, the validity period p1 is an indicator in order to evaluate how severe the potential conflict is. One example comprises that the determined RCI is repeated periodically with a periodicity and remains valid before the validity period p1 lapses. Hence, the apparatus UE2 may indicate the periodicity where RCI is repeated. Another example comprise that the RCI is repeated and stays valid for multiple slots between at least two apparatuses before the lapse of the validity period p1. In this case, the apparatus UE2 may send a repetition value, which indicates how many times or how many slots the RCI is repeated. Few bits can quantize the repetition value, e.g., 00: first time, 01: 2 times before, 10: 5 times before, 11: more than 5 times before.

For example, the validity period p1 is a function of one or multiple communication parameters cp, including at least one of the following: CBR, transmission range, QoS, communication group size, priority.

In one example, if p1 is function of CBR, it may be designed such that too many UEs report RCI indicating the same conflict is avoided. Thus, p1 is set to a large value if CBR is low and vice versa.

In another example, if T p1 is function of QoS, it may be designed such that the apparatus UE1 may extend p1 for high QoS transmissions.

In yet another example, if a potential conflict appears within a certain communication range, or if a certain communication group as in group-cast communication, or if the potential conflict appears in Sidelink communication and the measured/evaluated RSSI and/or RSRP exceeds the pre-configured or determined or mapped RSSI/RSRP thresholds, etc., the apparatus UE1 sends one or more transmissions including the RCI either standalone message or piggypacked to other messages.

According to an example, the validity period p1 is determined such that, the longer the potential conflict exists the higher the validity period p1 is set. Consequently, the apparatus UE1 remains transmitting the RCI corresponding to the existing/persisting potential conflict.

According to an example, in order to determine the validity period p1, apparatus UE1 monitors a set of radio resources, e.g., on one or more resource pools or at least one BWP where RCI is pre-configured. In order to declare the potential conflict for any of these identified resources, the apparatus UE2 is configured to monitor the radio resources within a monitoring window of a certain size of slots, measured in time units used for transmission, e.g., slots/ms. The monitoring window size may be pre-configured per resource pool or per BWP. Monitoring window size may be equal to a sensing window or shorter. The monitoring window may contain one or more potential resource conflicts. The apparatus UE1 may decide to determine and send a RCI if the conflict appears in the last T-max ms before a transmission opportunity. The identified potential conflict relative to UE1 transmission time-line may: a appear at least one time within the T-max before the transmission opportunity and not any time before monitoring window, e.g., validity time is 00; b appear at least one time within the T-max before transmission opportunity and another time before in monitoring window, e.g., validity time >=01; c appear in one or more periods before the RCI transmission opportunity, e.g., validity time >=01+the Periodicity P of the transmission of the RCI.

In another example, if the RCI procedure determines a transmission indicator for a determined RCI, and if the CBR is high enough, i.e., exceeding a certain CBR threshold, the apparatus UE1 may postpone the transmission of the RCI to the next possible selected, reselected or reserved radio resources by UE21 as far as the postponing time does not exceed allowed history time-factor or validity period p1.

Determining means 110 are configured to determine the at least one communication parameter cp in dependence on at least one of the monitored radio signals s0, s1. For example, Channel Busy Ratio CBR is defined as the proportion of channel time where the energy measured on the channel is above the Clear Channel Assessment CCA threshold. Mapping means 114 map the determined at least one communication parameter cp to at least one transmission parameter tp for the resource conflict indicator RC. Determining means 104 determine and/or transmitting means transmit 106 the resource conflict indicator RCI in dependence on the transmission parameter tp.

The resource conflict indicator RCI is determined and/or transmitted based on some triggering parameters. For example, the trigger is based on at least one of the following communication parameters of the monitored signals: CBR, CR, communication range, priority, survival-time, periodicity, or severity of the determined conflict e.g., how many times the collision appeared in the past.

The transmission parameter tp comprises at least one of the following: e.g., time validity, validity period p1, RSSI/RSRP threshold/Communication Priority/Communication group size. The at least one transmission parameter tp may be limited to/or Pre-configured to certain resource pools or a Bandwidth Part BWP. In one example, the Resource Pool Configuration/Pre-Configuration or the BWP pre-configuration for sidelink communication may define/enumerate/list those transmission parameter tp. In another example, the pre-configuration of apparatus UE2 for sidelink communication may define/enumerate/list the aforementioned transmission parameters.

In another example, based on the determined CBR for a given resource pool or a given BWP, UE1 may prioritize the assisting information of only the more severe potential conflicts e.g., based on RSSI, RSRP/Priority/QoS if SCI is decoded. Hence, a mapping between the CBR from one side and RCI priority based on priority field in the control information of the affected transmission and/or severity based on RSSI/RSRP, communication range, communication group, etc. is done. In this case, the RCI reporting may be limited only to a smaller number of sources of potential conflicts. The mapping function determines pre-configured ranges, where apparatus UE2 transmits the RCI. The mapping function comprises for example: CBR, RSSI_Threshold, RSRP_Threshold, Priority, and Communication Range.

In the previous examples, UE1 may evaluate the available/remaining size of a possibly reserved RCI and/or the possible channel occupancy ratio, CR that allows for future transmission. Accordingly, and based on the pre-configured mapping function defined above, UE1 may select/prioritize the RCIs associated with sever potential conflicts e.g., based on RSSI, RSRP/Priority/QoS if SCI is decoded. The selected prioritized RCIs can be transmitted first if possible. If the UE1 does not have further resources for further remaining RCIs to report, UE1 may drop all the remaining RCIs if they cannot be accommodated.

The determination of the resource conflict indicator RCI comprises at least one of the following or a combination of: sensing a dedicated radio channel that comprises the radio signals; measuring RSSI, Received Signal Strength Indicator, of the radio signals; measuring RSRP, Reference Signal Received Power, of the radio signals; measuring CBR, Channel Business Ratio, of the radio signals.

Determining means 122 determine the probability threshold th in dependence on the determined at least one communication parameter cp.

Determining means 120 draw a randomized value rv, for example a pseudo-random number according to a configured distribution. Determining means determine and/or transmitting means 106 transmit the resource conflict indicator RCI when the determined randomized value rv exceeds a probability threshold th.

Based on at least one communication parameter cp, the apparatus UE1 transmits the resource collision indicator RCI based on a random probability, which is configured as a range or a single value like the probability threshold th. For example, the apparatus UE1 will set the threshold th to a high value when measured/evaluated CBR is low and will set the probability threshold th to a small value when measured/evaluated CBR is high.

In another example, based on the computed CBR and/or CR, the UE1 may transmit RCI based on the random probability. Probability will be high when measured/evaluated CBR is small. After RCI is determined, UE1 may generate the random value rv with a distribution PDF-X e.g., uniform and compare it to the mapped value for the RCI transmission. If rv<=probability threshold th, the RCI is transmitted. Else if rv >th, then the RCI is backed-off to another transmission opportunity within the validity period p1 or, otherwise, the RCI is dropped. A mapping between the measured/evaluated CBR and evaluated CR from one side to the Probability of RCI TX P_i comprises, for example: CBR, CR, probability threshold th. The random process may be generated once after the potential conflict is identified and between identification moment t1 zero, 0 and a lapse of the validity period since the identification moment t1. Additionally, the random process may be generated one or more extra time after the first generation, i.e., for one potential conflict, and until a timer T expires.

In another example, the probability of transmitting RCI may be a function of configured transmission parameters: Priority of transmission, RSSI/RSRP Thresholds, communication range, etc. . . . . . Hence, a mapping can be represented differently as where P_i is the probability of sending RCI: probability threshold th, RSSI_Threshold, RSRP_Threshold, Priority, and Communication Range.

In yet another example, the probability of sending RCI may be a function or mapping between the measured/evaluated CBR and/or CR and transmission parameters e.g., Priority of transmission, RSSI/RSRP Thresholds, communication range, etc.

According to an example, the apparatus UE1 determines the at least one resource conflict indicator RCI at a point t1 in time; and transmits and/or re-transmits the resource conflict indicator RCI if a validity period p1 is running since the determined point t1 in time. Therefore, the apparatus UE1 may transmit a further determined RCI and not the older ones, i.e. elder than p1 ms.

According to another example, the apparatus UE1 transmits a validity indicator, for example indicating the validity period p1, associated with the determined at least one resource conflict indicator RCI.

The validity period p1 is configured or pre-configured, where the apparatus UE1 evaluates and considers the determined resource conflict indicator within the last p1 ms/slots/time units. For example, p1 is function of at least one of the following: CBR, RSPR, RSSI, communication range, and transmission priority.

For example, the validity period p1 is selected to allow apparatus UE1 to transmit RCI not elder than p1-ms/p1-slots/p1-time-Unit. Therefore, the validity period ca also be referred to as a forgetting factor of older RCIs. the validity period p1 itself is a function of at least one of the following: Channel Busy Ratio CBR, e.g., is for busy channel high CBR p1 is shorter as CBR occurred earlier, RCI is reported by other devices and vice versa when the CBR is low; a communication priority of the potentially conflicting communication; a communication range of the potentially conflicting communication; a communication group size associated with the potentially conflicting communication; communication survival time of the potentially conflicting communication. Upon the target apparatus UE2 receives the RCI, target apparatus UE2 starts after a short processing time re-evaluation of selected resources or directly trigger resource reselection.

Determining means 104 determine a plurality of resource conflict indicators RCI associated with a respective priority as the at least one transmission parameter tp. Selecting means 116 select one of the plurality of resource conflict indicators RCI in dependence on the associated priorities. Transmitting means 106 transmit the selected one of resource conflict indicators RCI prior to the remaining resource conflict indicators.

According to an example, the apparatus UE1 is further configured to determine an origin indicator, for example an identity or position or distance, of at least one further apparatus, for example UE0, which is involved in said resource conflict, in dependence on at least one of the monitored radio signals. For example, if the origin indicator indicates that the transmitting entity of the received radio signal is far away, then the resource conflict indicator is not determined or not transmitted. Therefore, if the origin indicator indicates that a distance to the transmitting entity of one of the plurality of received signals is above a distance threshold, then the determination or transmission of an associated resource conflict indicator is omitted. The resource conflict indicator RCI comprises the determined origin indicator. Advantageously, other apparatuses get aware of the identity and/or position of the conflicting entity and can react.

In an example, in group communication with possible connection establishment even when using unicast PC5 RRC signaling, configuration and capability of RCI can be transmitted using, e.g., PC5 RRC signaling, e.g., included in the UE capability information. Hence, the assisting UE1 may send an RRC message with a logical sidelink control channel SCCH containing the UE capability, e.g., UECapabilityInformationSidelink include: AssistingInformationCapability: set to true. Additionally, another UE may send a request for RCI or enquiry whether UE1 supports assisting information transmission, e.g., via UECapabilityEnquirySidelink. Additionally, size of the RCI can be set within the group using RRC establishment protocol. The specific configuration of the MAC control element CE containing the said RCI can be set or selected or configured via the RRC message establishment. In the configuration message, information about the RCI periodicity, time/frequency information, validity, etc., can be configured within the group. Hence, in an example a kind of synchronous RCI transmission between the group may be considered. For example, if the feedback is for RSRP, the RRC configures: filterCoefficientRSRPAssistingInformation.

In another example, in case of connection-less group communication, i.e., with no PC5 RRC signaling establishment, configuration of RCI is done by a base-station or is pre-configured and RCI establishment handshaking between UE pairs can be omitted.

Determining means 240 of UE2 determine that at least an overlap o between the at least one radio resource indicated via the resource conflict indicator RCI and at least one radio resource, which has been used by the apparatus UE2 for a transmission in the past, has occurred. Determining means 242 determine, if the overlap o is determined, at least one communication parameter cp2 in dependence on the at least one radio resource, which has been used by the apparatus UE2 for a transmission in the past. Determining means 244 determine the probability threshold th2 in dependence on the at least one determined communication parameter cp2.

The second UE2 receives via receiving means 206 the validity indicator associated with the at least one resource conflict indicator RC. Determining means 210 refrain from using at least one radio resource, which is indicated by the at least one resource conflict indicator RCI as long as the received validity indicator indicates that the received at least one resource conflict indicator RCI is valid.

Determining means 230 determine a set of candidate radio resources crr in dependence on the received at least one resource conflict indicator RC. Determining means 210 determine the radio resource rr2 for the transmission of the data d from the determined set of candidate radio resources crr.

The determination means 210 is configured to determine the set of candidate radio resources crr by omitting the indicated at least one radio resource that has the potential risk of the resource conflict. Therefore, the set of candidate resources is determined by excluding the at least one radio resource indicated by the resource conflict indicator from the candidate resources. By omitting the indicated at least one potentially conflicting radio resource, the set of candidate radio resources does not comprise the potentially conflicting radio resource.

Determining means 232 draw a randomized value rv2. Determining means 230 determine the set of candidate radio resources crr in dependence on the received resource conflict indicator RCI when the randomized value rv2 exceeds a probability threshold th2. According to an example, the suppressing probability is incremented by reducing the threshold th2 when it is triggered or when the set of candidate resources crr is determined.

Figure 4:
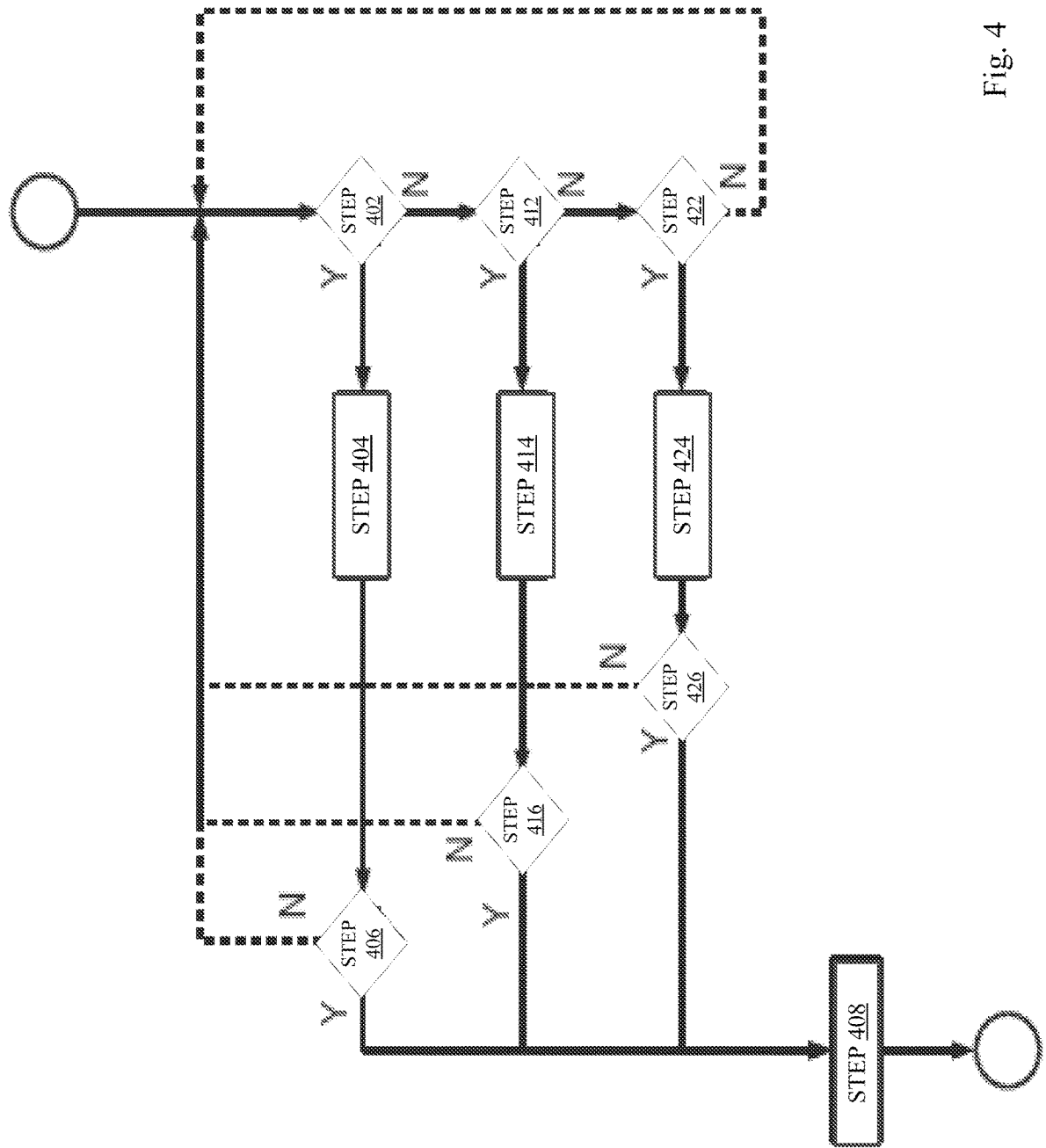
FIG. 4 depicts a schematical flow chart.

FIG. 4 depicts a schematical block diagram of the determining means 104 for the at least one resource conflict indicator. According to determining means 402 The determining means 402 determines, whether overlapping reservations of a plurality of further apparatuses can be decoded. If affirmative, RSRP for an overlapping transmission is determined as the at least one resource conflict indicator via determining means 404. SCIs are decoded before the overlapping resources i.e., as reservation or during the time instance of overlapping resources. According to determining means 406, there is determined, whether RSRP is greater than an associated threshold or whether communication is within a group or within a range or with a certain priority range. If affirmative, the potential conflict is determined via determining means 408.

If the result of determining means 402 is not affirmative, determining means 412 determines whether overlapping DMRS are decodable. DMRSs can be distinguishably decoded for one or more of the overlapping UEs. If the result of determining means 412 is affirmative, determining means 414 determines the resource conflict indicator in form of RSSI for the overlapping transmission based on DMRS. According to determining means 416, there is determined whether our society is greater than and associated threshold or whether the observed communication is associated with a group. If the result of the determining means 416 is affirmative, the determining means 408 determines the potential conflict.

If the result of the determining means 412 is not affirmative, determining means 422 determines whether overlapping SCI and DMR as are not decodable. If the result of the determining means 422 is affirmative, determining means 424 determines the at least one resource conflict indicator in form of RSSI for the overlapping transmission, for example based on an energy level detected. RSSI can be computed based on energy detected on the DMRS locations configured for the resource pool. According to determining means 426, there is determined if RSI is greater than and associated threshold. If the result of the determining means 426 is affirmative, determining means 408 determines the potential conflict on at least one radio resource.

Figure 5:
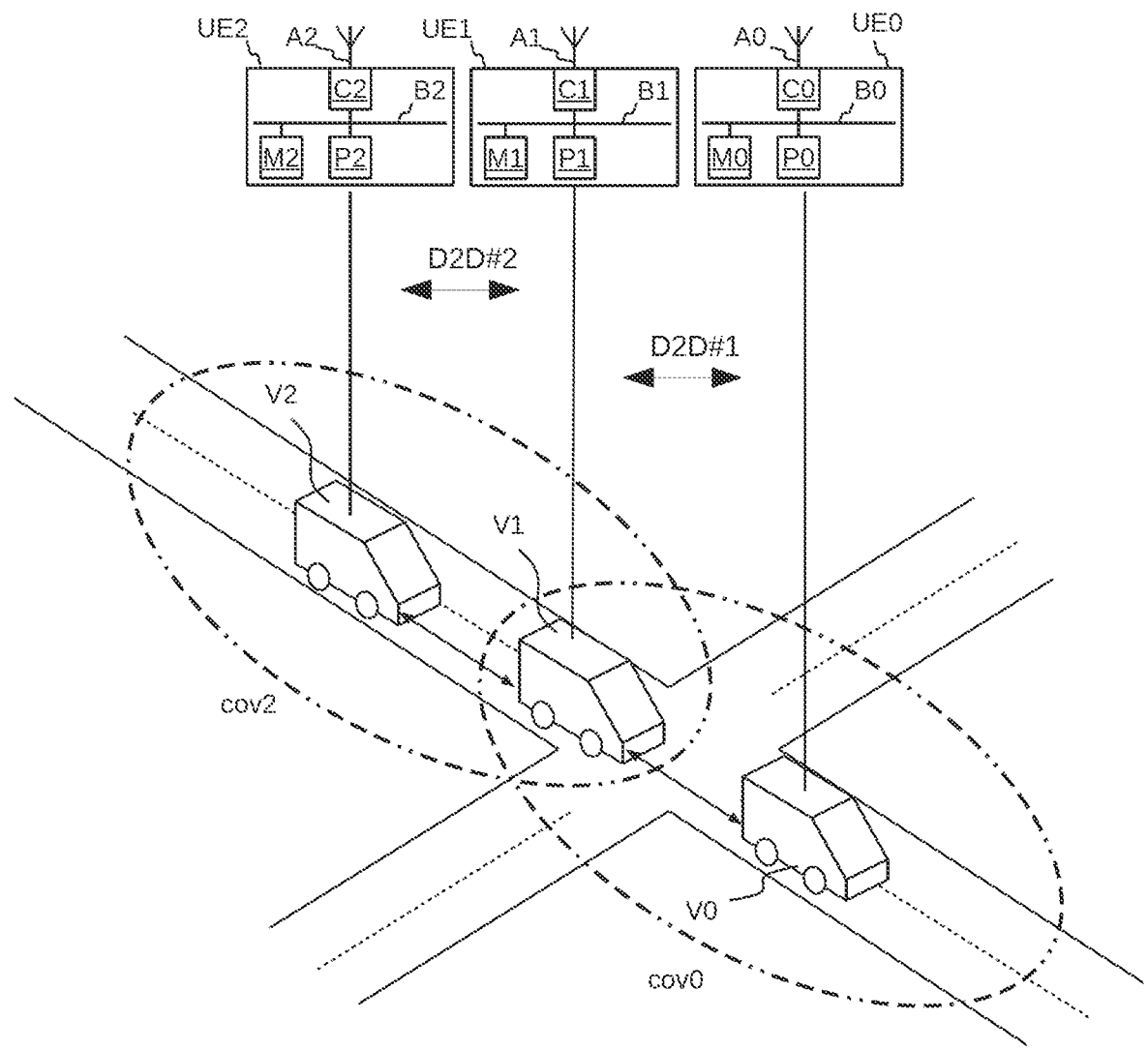
FIG. 5 depicts schematically a traffic situation.

FIG. 5 shows a schematic perspective view of an exemplary traffic situation. UE0 transmits signals to UE1, but UE2 is out of reach as indicated by the coverage areas cov0, cov1. Therefore, direct radio channels D2D #1, D2D #2 are used to communicate between UE0 and UE1, UE1, UE2, respectively. Each vehicle V0, V1, V2 comprises radio terminal in form of the apparatus UE0, UE1, UE2, which together form a radio communication network. Each of the apparatuses UE0, UE1, UE2 comprises a data bus B0, B1, B2 connecting at least one processor P0, P1, P2, a memory M0, M1, M2 and a radio module C0, C1, C2. At least one antenna A0, A1, A2 is connected to the radio module C0, C1, C2. The respective radio module C0, C1, C2 is configured to transmit and receive radio signals via the antenna A0, A1, A2. A computer program in the sense of a computer program product is stored in the memory M0, M1, M2. The computer program is designed to execute the method steps set out in this description, in particular with the aid of the at least one processor P0, P1, P2, the at least one memory M0, M1, M2 and the at least one radio module C0, C1, C2, and to communicate with further terminals via the at least one antenna A0, A1, A2. Alternatively or additionally, the processors P0, P1, P2 are implemented as ASICs in order to execute the described method steps.

The invention claimed is:

1. An apparatus (UE1) comprising at least one processor, at least one memory including computer program code, and at least one communication module, the at least one memory and computer program code configured, with the at least one processor, and the at least one communication module, to cause the apparatus (UE1) to:
   receive (102) a plurality of radio signals (s0, s2);
   determine (110) at least one communication parameter (cp) based on at least one of the radio signals (s0, s1);
   determine (104) at least one resource conflict indicator (RCI) based on the received radio signals (s0, s2) and sidelink control information (SCI) decoding, wherein sidelink control information (SCI) of at least one other apparatus (UE0, UE2) is decoded prior to determining (104) the at least one resource conflict indicator (RCI), wherein the decoded SCI includes overlapping reservations, wherein the at least one resource conflict indicator (RCI) indicates at least one radio resource (rr1) that has a potential risk of a resource conflict, and wherein the determined at least one communication parameter (cp) is mapped (114) to a transmission parameter (tp) for the resource conflict indicator (RCI); and
   transmit (106) the resource conflict indicator (RCI).

2. The apparatus (UE1) according to claim 1, wherein the at least one memory and computer program code configured, with the at least one processor, and the at least one communication module, to cause the apparatus (UE1) to:
   determine (104) the at least one resource conflict indicator (RCI) at a point (t1) in time; and
   transmit (106) and/or re-transmit (106) the resource conflict indicator (RCI) if a validity period (p1) is running since the determined point (t1) in time;
   and/or
   transmit (106) a validity indicator ( ) associated with the determined at least one resource conflict indicator (RCI).

3. The apparatus (UE1) according to claim 2, wherein the at least one memory and computer program code configured, with the at least one processor, and the at least one communication module, to cause the apparatus (UE1) to:
   determine (112) the at least one validity period (p1) based on the determined at least one communication parameter (cp).

4. The apparatus (UE1) according to claim 1, wherein the transmission parameter (tp) is a priority, and wherein the at least one memory and computer program code configured, with the at least one processor, and the at least one communication module, to cause the apparatus (UE1) to:
   determine (104) a plurality of resource conflict indicators (RCI) associated with a respective priority as the at least one transmission parameter (tp); and
   select (116) one of the plurality of resource conflict indicators (RCI) based on the associated priorities for the plurality of resource conflict indicators (RCI); and
   transmit (106) the selected one of resource conflict indicators (RCI).

5. The apparatus (UE1) according to claim 1, wherein the at least one memory and computer program code configured, with the at least one processor, and the at least one communication module, to cause the apparatus (UE1) to:
   receive (118) a part of the mapping (mp1) between the at least one communication parameter (cp) and the at least one transmission property (tp).

6. The apparatus (UE1) according to claim 1, wherein the at least one memory and computer program code configured, with the at least one processor, and the at least one communication module, to cause the apparatus (UE1) to:
   draw (120) a randomized value (rv); and
   determine (102) and/or transmit (106) the resource conflict indicator (RCI) when the determined randomized value (rv) exceeds a probability threshold (th).

7. The apparatus (UE1) according to claim 1, the at least one memory and computer program code configured, with the at least one processor, and the at least one communication module, to cause the apparatus (UE1) to:
   determine (122) the probability threshold (th) based on the determined at least one communication parameter (cp).

8. The apparatus (UE1) according to claim 1, wherein the at least one resource conflict indicator (RCI) indicates the at least one radio resource (rr1) that has the potential risk of the resource conflict on a radio channel being used by a plurality of apparatuses (UE0, UE1, UE2).

9. The apparatus (UE1) according to claim 1, wherein the at least one memory and computer program code configured, with the at least one processor, and the at least one communication module, to cause the apparatus (UE1) to:
   subsequent to the at least one resource conflict indicator (RCI) indicating the at least one radio resource (rr1) that has the potential risk of the resource conflict and determining the at least one resource conflict indicator (RCI) based on the received radio signals (s0, s2) and the sidelink control information (SCI), initialize a message for transmitting the at least one resource conflict indicator (RCI) in a communication layer.

10. The apparatus (UE1) according to claim 1, wherein the at least one memory and computer program code configured, with the at least one processor, and the at least one communication module, to cause the apparatus (UE1) to:
    select the resource conflict indicator (RCI) for prioritized transmission based on at least one selected from a group consisting of: a Channel Busy Ratio (CBR), a received signal strength indicator (RSSI), a reference signal received power (RSRP), a priority, a quality of service (QoS).

11. The apparatus (UE1) according to claim 1, wherein the at least one resource conflict indicator (RCI) indicates the at least one radio resource (rr1) that has the potential risk of the resource conflict based on at least one of a received signal strength (RSSI) and a reference signal received power (RSRP).

12. The apparatus (UE1) according to claim 1, wherein the at least one resource conflict indicator (RCI) is determined based on demodulation reference signal (DMRS) decoding.

13. The apparatus (UE1) according to claim 1, wherein the at least one resource conflict indicator (RCI) is transmitted with a validity period, wherein the validity period (p1) indicates a severity of the at least one radio resource (rr1) that has the potential risk of the resource conflict.

14. The apparatus (UE1) according to claim 1, wherein the at least one resource conflict indicator (RCI) is transmitted with at least one selected from a group consisting of:

a priority field of the assisting information, a time/frequency resources of possible colliding packets, a number of colliding transmitters on different resources, a time validity of the RCI, a periodicity of the occurrence of the at least one resource conflict indicator (RCI), a periodicity of the indicated radio resources, a time offset of the potential resource conflict indicated from the point of time of reporting of the at least one resource conflict indicator (RCI), a periodicity (P) of the at least one resource conflict indicator (RCI), frequency positions of overlapping resources, and Resource Pools/BWPs index indices of the potential resource conflict.

15. The apparatus (UE1) according to claim 1, wherein the resource conflict indicator (RCI) includes a time-index, wherein the time-index indicates where a resource conflict exists from a reference point with respect to a time-line of the apparatus (UE1) or a network.

16. The apparatus (UE1) according to claim 15, wherein the reference point is at least one from a group consisting of: an instance where the apparatus (UE1) reported information, a network sub-frame number SFN, and a time-stamp computed from a Global Navigation Satellite System (GNSS).

\* \* \* \* \*